TELEVISION RECEIVER CONTROL ARRANGEMENT

Filed June 25, 1954

GILBERT E. GUSTAFSON
CARL J. STEINKE
INVENTORS.

BY Francis W. Crotty
THEIR ATTORNEY.

United States Patent Office 2,796,601

Patented June 18, 1957

2,796,601

TELEVISION RECEIVER CONTROL ARRANGEMENT

Gilbert E. Gustafson, River Forest, and Carl J. Steinke, Des Plaines, Ill., assignors to Zenith Radio Corporation, a corporation of Illinois Application June 25, 1954, Serial No. 439,324

5 Claims. (Cl. 340—367)

This invention relates to a television receiver and more particularly to a structural arrangement thereof to facilitate adjustment of the receiver.

Television receivers are conventionally assembled by mounting a rectangularly shaped cathode-ray image-reproducing device or picture tube, a radio-frequency tuner or channel selector, and all the other essential components on top of and partially within a horizontally positioned metal chassis. The entire receiver chassis is consequently one integral unit and may itself be mounted within any desired type of cabinet. The various tuning and adjusting controls usually protrude through appropriate holes in the cabinet to permit adjustment of the receiver operating characteristics by the viewer. However, due to the fact that all of the components of the receiver are supported by the metal chassis, the two controls that are used more than any others, namely the channel selector and the volume control, are physically positioned below the picture tube. Consequently, a person desiring to change channels or adjust the volume must reach or stoop down to do so, especially if the cabinet is a console model.

To alleviate this inconvenience to televiewers, receivers have been constructed in which the picture tube is supported by the cabinet structure and the metal chassis, which supports all the other components, is mounted vertically within the cabinet along side the image reproducer. With such an arrangement, the channel selector is positioned close to the top of the cathode-ray image-reproducing device but the volume control is still positioned below the picture tube, usually on the bottom portion of the vertically mounted chassis well below the channel selector knob. In order to mount the chassis along side the picture tube in this manner, considerably more cabinet width is required and that is most undesirable in view of the trend to larger picture tubes.

It is, accordingly, an object of the present invention to provide an improved control arrangement for a television receiver which facilitates convenient, effortless adjustment by the viewer.

It is a more particular object of the invention to provide a television receiver characterized by the fact that the channel selector and volume control adjustments are physically positioned above the picture tube, and yet employs a normal size cabinet structure having a width only slightly larger than the width of the picture tube.

A television receiver, constructed in accordance with the invention, comprises a cathode-ray image-reproducing device including a front flared portion having an end wall forming a rectangularly shaped screen area of a predetermined width and further including a rear neck having a cross-sectional area small with respect to that of the end wall. A chassis is provided to support signal translating stages for controlling the reproducing device. A cabinet houses the chassis and reproducing device in functional relation with respect to one another and includes a front portion having a width only slightly larger than the width of the screen area. This front portion is cut-away to expose substantially all of the screen area. A transparent safety plate is mounted to the front portion of the cabinet in overlying relation with the cut-away portion thereof and this plate has provisions at its upper corner sections for receiving control shafts. A channel selector, for tuning the television receiver to any one of a plurality of channels, is positioned adjacent the neck portion of the image-reproducing device above the median plane thereof and rearwardly of the flared portion. A volume control is likewise positioned above the median plane of the image-reproducing device. The television receiver includes a control shaft for the channel selector projecting through one of the corner sections of the safety plate, and a control shaft for the volume control projecting through the other one of the corner sections of the safety plate. Finally, the television receiver comprises an actuating knob which is mounted on each of the control shafts.

The features of this invention which are believed to be new are set forth with particularity in the appended claims. The invention, together with further objects and advantages thereof, may best be understood, however, by reference to the following description in conjunction with the accompanying drawings, in which:

Figure 1:
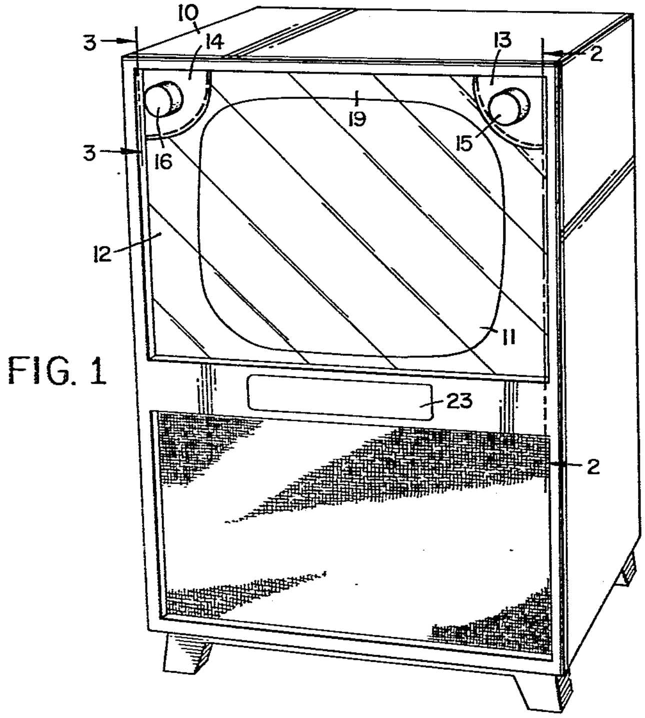
Figure 1 represents a television receiver constructed in accordance with the invention.
Figure 2:
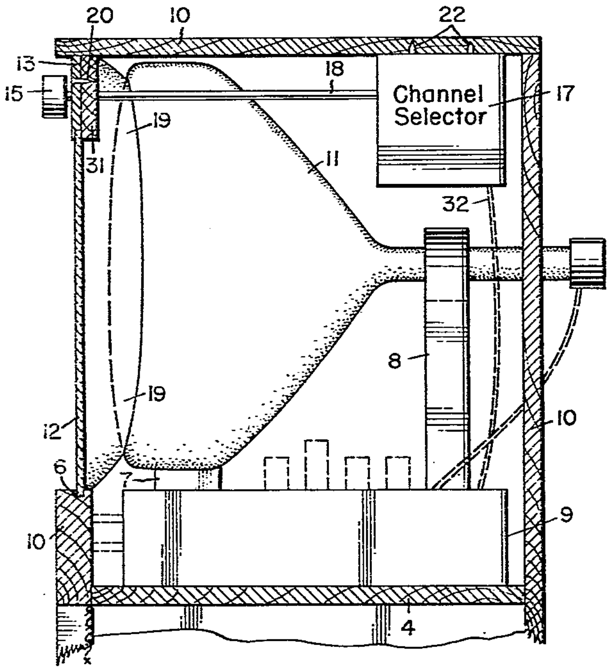
Figure 2 is a sectional view of a portion of the receiver of Figure 1 taken along the line 2—2.
Figure 3:
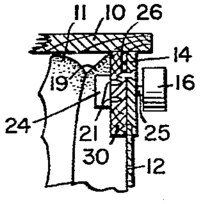
Figure 3 is another sectional view of a portion of the receiver of Figure 1 taken along the line 3—3.

Referring now more particularly to Figures 1–3, the receiver there illustrated is constructed to utilize a television signal having video and audio components selectively received over any one of a plurality of different signal channels. It comprises the usual cathode-ray image-reproducing device or picture tube 11 having a front flared portion terminating in an end wall which constitutes a rectangularly shaped screen area of predetermined height and width. It further includes a rear neck portion having a cross-sectional area small with respect to that of the flared portion or the screen area. A chassis assembly 9 supports picture tube 11 by means of a cradle 7 and a support 8, the latter serving concurrently as the mount for a conventional deflection yoke made up of the customary horizontal and vertical deflection windings. A cabinet structure 10 houses chassis 9 and picture tube 11. To that end, a horizontally disposed shelf 4 is provided within the cabinet, spaced from the top panel thereof by a distance which only slightly exceeds the maximum height of the chassis with the picture tube in place. The cabinet also includes a rectangularly shaped front portion or panel having a width only slightly larger than the width of the screen area of the tube. The front panel is cut-away to expose substantially the entire screen area of picture tube 11 and a rectangularly shaped transparent safety plate 12 of glass is mounted to the front panel in a manner to be described and covers the cut-away portion thereof. The bottom edge of glass 12 preferably lies in a groove 6 extending across the front panel of cabinet 10. Provision is made at the upper corner sections of plate 12 for receiving control shafts. Specifically, in the embodiment shown the two upper corner sections of the plate are cut-away as represented by the broken-construction lines in Figure 1. A mask 19, constructed of plastic or other decorative as well as insulating material, surrounds the screen area of picture tube 11, serving both as a frame and a dust shield since it extends from the picture screen to the front panel of the cabinet.

A radio-frequency or channel selector tuner 17, shown in block outline in Figure 2, is provided for tuning the receiver to any selected one of the plurality of available television channels. Selector 17 is affixed by means of mounting screws 22 to the top panel of cabinet structure 10 and is positioned adjacent the neck portion of picture tube 11 above the median plane thereof and rearwardly of the flared front portion. This space is available because of the shape of the picture tube. A volume control 24, shown in block outline in Figure 3, permits adjusting the amplitude of the audio components of the television signal and is mounted to cabinet structure 10 by means of screws 21 above the median plane of image-reproducer 11. Screws 21 may thread into a corner mounting bracket 30 which depends from the top panel of cabinet 10 behind one cut-away top corner of plate 12. A first control shaft 18 coupled to channel selector 17 extends laterally of the cabinet, along side the envelope of the picture tube, and projects through the right-hand cut-away top corner section of glass plate 12. It may be maintained in position by another corner mounting bracket 31, similar to bracket 30. A second control shaft 25 is connected to volume control 24 and projects through the left-hand cut-away top corner section of glass plate 12.

A first removable escutcheon plate 13 is secured to corner bracket 31 of the cabinet by means of a mounting screw 20 and covers the area determined by the right-hand cut-away corner section of glass 12. It has an aperture for accommodating control shaft 18. Plate 13 constitutes a mechanical lock for retaining safety glass 12 in place on cabinet 10 since its curved peripheral edge overlaps the cut-away corner of plate 12 as indicated in Figure 2. A second removable escutcheon plate 14 is secured to corner bracket 30 of the cabinet in the same manner as escutcheon plate 13, as shown in Figure 3. Specifically, plate 14 is secured by means of a mounting screw 26 and covers the area determined by the left-hand cut-away corner section of safety glass 12. It also is apertured to receive control shaft 25. Escutcheon plate 14 constitutes another mechanical lock for retaining safety glass plate 12 in place on cabinet 10. A removable channel selector knob 15 is mounted on shaft 18 forwardly of escutcheon plate 13 and a similar removable knob 16 is mounted on shaft 25 forwardly of escutcheon plate 14.

Chassis 9 supports all the other controls, various components and signal translating stages of the television receiver, some of which are shown in dashed line construction in Figure 2. The conventional fine tuning, focus, brightness, contrast and like controls project forwardly of the chassis but below the picture tube and access to them may be gained by swinging a hinged cover plate 23 down and away from the cabinet in the usual manner. Of course, the necessary electrical connections, some of which are shown by dashed lines, are provided between the chassis, picture tube, channel selector and volume control. For example, where the tuner includes stages of radio-frequency amplification and frequency conversion, developing an intermediate-frequency signal, its output is coupled via a cable 32 to the intermediate-frequency stages constructed on chassis 9.

With this arrangement, safety glass plate 12 may be removed for cleaning very simply merely by removing knobs 15 and 16 from their respective shafts and by removing plates 13 and 14 from the corner brackets of the cabinet. Plate 13 may be removed by releasing screw 20 and plate 14 may be removed by releasing screw 26. The safety glass may then be tilted forwardly of the cabinet and lifted from the groove in the front panel which otherwise maintains the bottom edge of the glass in place.

The described arrangement permits a normal size cabinet to be used for a given size picture tube even though the channel selector and volume controls are located above the picture tube for the added convenience of the user. Of course, the instrument is operated in the ordinary, normal way and yet, the escutcheon plate arrangement facilitates removal of the safety glass for cleaning purposes.

While a particular embodiment of the invention has been shown and described, modifications may be made, and it is intended in the appended claims to cover all such modifications as may fall within the true spirit and scope of the invention.

We claim:

1. A television receiver comprising: a cathode-ray image-reproducing device including a front flared portion having an end wall forming a rectangularly shaped screen area of a predetermined width and further including a rear neck portion having a cross-sectional area small with respect to that of said end wall; a chassis supporting signal translating stages for controlling said reproducing device; a cabinet housing said chassis and reproducing device in functional relation with respect to one another and including a front portion having a width only slightly larger than the width of said screen area, said front portion being cut-away to expose substantially all of said screen area; a transparent safety plate mounted to said front portion of said cabinet in overlying relation with the cut-away portion thereof and having provisions at its upper corner sections for receiving control shafts; a channel selector, for tuning said receiver to any one of a plurality of channels, positioned adjacent said neck portion of said reproducing device above the median plane thereof and rearwardly of said flared portion; a volume control likewise positioned above the median plane of said image-reproducing device; a control shaft for said channel selector projecting through one of said corner sections of said safety plate; a control shaft for said volume control projecting through the other one of said corner sections of said safety plate; and an actuating knob mounted on each of said control shafts.

2. A television receiver comprising: a cathode-ray image-reproducing device including a front flared portion having an end wall forming a rectangularly shaped screen area of a predetermined width and further including a rear neck portion having a cross-sectional area small with respect to that of said end wall; a chassis supporting signal translating stages for controlling said reproducing device; a cabinet housing said chassis and reproducing device in functional relation with respect to one another and including a front portion having a width only slightly larger than the width of said screen area, said front portion being cut-away to expose substantially all of said screen area; a transparent safety plate mounted to said front portion of said cabinet in overlying relation with the cut-away portion thereof and having cut-away upper corner sections; a channel selector, for tuning said receiver to any one of a plurality of channels, positioned adjacent said neck portion of said reproducing device above hte median plane thereof and rearwardly of said flared portion; a volume control likewise positioned above the median plane of said image-reproducing device; a control shaft for said channel selector projecting through one of said cut-away corner sections of said safety plate; a control shaft for said volume control projecting through the other one of said cut-away corner sections; a first escutcheon plate overlying said one cut-away corner section to constitute a mechanical lock for retaining said safety plate in position and having an aperture through which one of said shafts extends; a second escutcheon plate overlying said other cut-away corner section to constitute another mechanical lock for retaining said safety plate in position and having an aperture through which the other of said shafts extends; and an actuating knob mounted on each of said control shafts forwardly of the corresponding one of said escutcheon plates.

3. A television receiver comprising: a cathode-ray image-reproducing device including a front flared portion having an end wall forming a rectangularly shaped screen area of a predetermined width and further including a rear neck portion having a cross-sectional area small with respect to that of said end wall; a chassis supporting signal translating stages for controlling said reproducing device; a cabinet housing and supporting said chassis and reproducing device in functional relation with respect to one another and including a rectangularly shaped front portion having a width only slightly larger than the width of said screen area, said front portion being cut-away to expose substantially all of said screen area and having a horizontally disposed groove extending along the lower edge of its cut-away section; a rectangularly shaped safety glass plate overlying the cut-away portion of said cabinet structure with its lower edge received in said groove, said safety plate having cut-away upper corner sections; a channel selector, for tuning said receiver to any one of a plurality of channels, positioned adjacent said neck portion of said reproducing device above the median plane thereof and rearwardly of said flared portion; a volume control likewise positioned above the median plane of said image-reproducing device; a control shaft for said channel selector projecting through one of said cut-away corner sections of said safety glass plate; a control shaft for said volume control projecting through the other one of said cut-away corner sections; a first removable escutcheon plate overlying said one cut-away corner section to constitute a mechanical lock for retaining said safety glass plate in position and having an aperture through which one of said shafts extends; a second removable escutcheon plate overlying said other cut-away corner section to constitute another mechanical lock for retaining said safety glass plate in position and having an aperture through which the other of said shafts extends; and a removable actuating knob mounted on each of said control shafts forwardly of the corresponding one of said escutcheon plates.

4. A television receiver comprising: a cathode-ray image-reproducing device including a front flared portion having an end wall forming a rectangularly shaped screen area of a predetermined width and further including a rear neck portion having a cross-sectional area small with respect to that of said end wall; a chassis supporting signal translating stages for controlling said reproducing device; a cabinet housing and supporting said chassis and reproducing device in functional relation with respect to one another and including a rectangularly shaped front portion having a width only slightly larger than the width of said screen area, said front portion being cut-away to expose substantially all of said screen area and having a horizontally disposed groove extending along the lower edge of its cut-away section; a rectangularly shaped safety glass plate overlying the cut-away portion of said cabinet structure with its lower edge received in said groove, said safety plate having cut-away upper corner sections; a channel selector, for tuning said receiver to any one of a plurality of channels, mounted to said cabinet and positioned adjacent said neck portion of said reproducing device above the median plane thereof and rearwardly of said flared portion; a volume control mounted to said cabinet and likewise positioned above the median plane of said image-reproducing device; electrical cable connections from said chassis to said channel selector and to said volume control; a control shaft for said channel selector projecting through one of said cut-away corner sections of said safety glass plate; a control shaft for said volume control projecting through the other one of said cut-away corner sections; a first removable escutcheon plate overlying said one cut-away corner section to constitute a mechanical lock for retaining said safety glass plate in position and having an aperture through which one of said shafts extends; a second removable escutcheon plate overlying said other cut-away corner section to constitute another mechanical lock for retaining said safety glass plate in position and having an aperture through which the other of said shafts extends; and a removble actuating knob mounted on each of said control shafts forwardly of the corresponding one of said escutcheon plates.

5. A television receiver comprising: a cathode-ray image-reproducing device including a front flared portion having an end wall forming a rectangularly shaped screen area of a predetermined width and further including a rear neck portion having a cross-sectional area small with respect to that of said end wall; a chassis upon which said image-reproducing device is supported, the assembly of said chassis and reproducing device having a given overall height; a cabinet having a shelf, spaced from the top a distance slightly more than said given overall height, upon which the assembly of said chassis and reproducing device is supported and including a rectangularly shaped front portion having a width only slightly larger than the width of said screen area, said front portion being cut-away to expose substantially all of said screen area and having a horizontally disposed groove extending along the lower edge of its cut-away section; a rectangularly shaped safety glass plate overlying the cut-away portion of said cabinet structure with its lower edge received in said groove, said safety plate having cut-away upper corner sections; a channel selector, for tuning said receiver to any one of a plurality of channels, mounted to said cabinet and positioned adjacent said neck portion of said reproducing device above the median plane thereof and rearwardly of said flared portion; a volume control mounted to said cabinet and likewise positioned above the median plane of said image-reproducing device; electrical cable connections from said chassis to said channel selector and to said volume control; a control shaft for said channel selector positioned on one side of said image-reproducing device and projecting through one of said cut-away corner sections of said safety glass plate; a control shaft for said volume control positioned on the other side of said image-reproducing device and projecting through the other one of said cut-away corner sections; a first removable escutcheon plate overlying said one cut-away corner section to constitute a mechanical lock for retaining said safety glass plate in position and having an aperture through which one of said shafts extends; a second removable escutcheon plate overlying said other cut-away corner section to constitute another mechanical lock for retaining said safety glass plate in position and having an aperture through which the other of said shafts extends; and a removable actuating knob mounted on each of said control shafts forwardly of the corresponding one of said escutcheon plates.

References Cited in the file of this patent

UNITED STATES PATENTS

| | | |
|---|---|---|
| 1,959,266 | Finnegan | May 15, 1934 |
| 2,692,983 | Eisenkramer | Oct. 26, 1954 |

OTHER REFERENCES

Rider: J. F. Television Manual, vol. 2 (1949), Zenith TV pages 2–13.

Crosley Radio and Television Retailing, January 1950, page 10.